United States Patent
Iyoki et al.

(10) Patent No.: US 9,650,257 B2
(45) Date of Patent: May 16, 2017

(54) PROCESS FOR PRODUCING VET-TYPE ZEOLITE

(71) Applicants: UniZeo Co., Ltd., Tokyo (JP); The University of Tokyo, Tokyo (JP)

(72) Inventors: Kenta Iyoki, Tokyo (JP); Tatsuya Okubo, Tokyo (JP); Keiji Itabashi, Tokyo (JP)

(73) Assignees: UNIZEO CO., LTD., Tokyo (JP); The University of Tokyo (JP)

( * ) Notice: Subject to any disclaimer, the term of this patent is extended or adjusted under 35 U.S.C. 154(b) by 122 days.

(21) Appl. No.: 14/761,682

(22) PCT Filed: Jan. 17, 2014

(86) PCT No.: PCT/JP2014/050847
§ 371 (c)(1),
(2) Date: Jul. 17, 2015

(87) PCT Pub. No.: WO2014/112601
PCT Pub. Date: Jul. 24, 2014

(65) Prior Publication Data
US 2015/0360963 A1  Dec. 17, 2015

(30) Foreign Application Priority Data

Jan. 18, 2013  (JP) ................. 2013-007376
Apr. 15, 2013  (JP) ................. 2013-084902

(51) Int. Cl.
*C01B 39/46* (2006.01)
*C01B 39/48* (2006.01)
(Continued)

(52) U.S. Cl.
CPC ............. *C01B 39/48* (2013.01); *C01B 39/06* (2013.01); *C01B 39/08* (2013.01)

(58) Field of Classification Search
CPC ......... C01B 29/46; C01B 29/06; C01B 29/08; B01J 29/70
See application file for complete search history.

(56) References Cited

U.S. PATENT DOCUMENTS 5,591,421 A  1/1997 Zones
5,656,149 A  8/1997 Zones et al.

FOREIGN PATENT DOCUMENTS

CN  1304873 A  7/2001
JP  10-502608 A  3/1998

OTHER PUBLICATIONS

"VET", http://america.iza-structure.org/IZA-SC/Atlas_pdf/Vet.pd; downloaded (Jan. 4, 2017).*

(Continued)

*Primary Examiner* — David M Brunsman
(74) *Attorney, Agent, or Firm* — Locke Lord LLP; James E. Armstrong, IV; Nicholas J. DiCeglie, Jr.

(57) ABSTRACT

A process for producing a VET-type zeolite is provided in which the use of a structure-directing agent is minimized and the environmental burden can be minimized. This process for producing a VET-type zeolite comprises (1) mixing a zinc source, an element $M^1$ source, an alkali source, and water so as to result in a reaction mixture having a specific composition in terms of molar ratio, (2) using, as seed crystals, a VET-type zeolite which has an $M^1O_2/ZnO$ ratio of 5-30 and adding the zeolite to the reaction mixture in an amount of 0.1-30 wt % relative to the $M^1O_2$ contained in the reaction mixture, and (3) heating the reaction mixture to which the seed crystals have been added, at 80-200° C. in a hermetically closed state. $M^1$ represents silicon or a mixture of silicon and germanium.

7 Claims, 3 Drawing Sheets

EXAMPLE 1 (VET-TYPE ZEOLITE)

(51) Int. Cl.
    *C01B 39/08* (2006.01)
    *C01B 39/06* (2006.01)

(56) References Cited

OTHER PUBLICATIONS

Camblor, M.A. et al, "Synthesis of VPI-8: The first Large Pore Zincosilicate", Chemical Industries (Synthesis of Microporous Materials), vol. 69, 1997, pp. 243-261.

Shvets, A.V. et al., "Effect of Introduction of Aluminum on the Structure and Adsorption Properties of Zeolites of VPI-8 Type", Theoretical and Experimental Chemistry, Sep. 1, 2000, vol. 36, No. 5, Kluwer Academic Publishers-Plenum Publishers, pp. 290-294.

Annen, Michael J. et al., "Raman and 29 Si MAS NMR spectroscopy of framework materials containing three-membered rings", Microporous Materials, Feb. 1993, vol. 1, No. 1, pp. 57-65.

Extended Search Report dated Nov. 9, 2015, issued in counterpart European Application No. 14741016.1-1355/2947049 PCT/JP2014050847 (74 pages).

International Search Report dated Apr. 15, 2014, issued in counterpart application No. PCT/JP2014/050847 (1 page).

Freyhardt, et al., "VPI-8: A High-Silica Molecular Sieve with a Novel 'Pinwheel' Building Unit and Its Implications for the Synthesis of Extra-Large Pore Molecular Sieves", Journal of American Chemical Society, 1996, vol. 118, pp. 7299-7310.

Yoshikawa, et al., "Synthesis of VPI-8 I. The effects of reaction components", Microporous Materials, 1997, vol. 11, pp. 127-136.

Yoshikawa, et al., "Synthesis of VPI-8. II Mechanism of crystallization", Microporous Materials, 1997, vol. 11, pp. 137-148.

Serrano, et al., "Mechanism of CIT-6 and VPI-8 Crystallization from Zincosilicate Gels" Chemistry—A European Journal, 2002, vol. 8, No. 22, pp. 5153-5160.

Office Action issued in corresponding Chinese Patent Application No. CN 201480004929.X, dated Mar. 18, 2016.

B. Xie, "Seeded Synthesis of Zeolites in the Absence of Organic Templates," China's Doctor's Dissertation Database—Engineering Science, vol. 9, p. 36 (2010).

C. Xue, "2-4" Synthesis and Characterization of two dimensional zeolite framework, China's Outstanding Master's Thesis Database, vol. 1, pp. 27-28, (2004).

\* cited by examiner

SEED CRYSTAL (VET-TYPE ZEOLITE)

EXAMPLE 1 (VET-TYPE ZEOLITE)

EXAMPLE 10 (VET-TYPE ZEOLITE)

PROCESS FOR PRODUCING VET-TYPE ZEOLITE

This application is a 371 filing of PCT/JP2014/050847, filed Jan. 17, 2014.

TECHNICAL FIELD

The present invention relates to a method for producing a VET-type zeolite.

BACKGROUND ART

Synthetic zeolites, which are in a narrow sense crystalline aluminosilicate, include isomorphous derivatives in which a metal atom within the framework is substituted with another metal atom. Examples of isomorphous derivatives of crystalline aluminosilicate include zincosilicate in which an aluminum atom of aluminosilicate is substituted with a zinc atom. A synthetic zeolite has uniform pores with angstrom sizes attributed to a crystal structure thereof. Taking advantage of such a feature, the synthetic zeolite has been industrially used as a molecular sieving adsorbent that adsorbs only a molecule having a particular size, an adsorption separating agent that adsorbs a molecule having strong affinity, or a catalytic base.

In the technical field of zeolites, VET refers to a particular framework structure type having a one-dimensional channel architecture. Zeolites having this structure include zincosilicate such as VPI-8 and SSZ-41 and zincoaluminosilicate. VET-type zeolites are zeolites having 12-membered rings and large pores. VET-type zeolites are promising as a catalyst for use in various hydrocarbon conversion reactions, for example as a catalyst for use in catalytic cracking, hydrocracking, dewaxing, alkylation, transalkylation, production of olefins and aromatic compounds, and the like. Conventionally, VET-type zeolites are produced exclusively by methods where a quaternary ammonium compound or the like is used as an organic structure-directing agent (hereinafter, abbreviated to "OSDA") (see Patent Documents 1 and 2 and Non-patent Documents 1-4). Therefore, it has been believed that it is essential to use an OSDA in order to obtain the VET-type zeolite. In addition, it has been believed that it is inevitable for the synthesized VET-type zeolite to be fired so as to remove an OSDA before use because it contains the OSDA.

A synthetic method of the VET-type zeolite is, for example, as described in Patent Documents 1 and 2, and Non-patent Documents 1-4. A common method is one using a quaternary ammonium compound such as a tetraethylammonium compound as an OSDA in the coexistence of sodium ions and lithium ions. However, since said OSDA is expensive, it is not advantageous to be used industrially. In addition, since the OSDA is incorporated in the crystals of the produced zeolite, it is necessary to fire the zeolite to remove the OSDA when the zeolite is used as an adsorbent or a catalyst. Exhaust gases produced at that time are responsible for environmental pollution, and further, many drugs are required for detoxification treatment of synthesized mother liquor containing decomposition products of the OSDA. In this way, the method for synthesizing the VET-type zeolite using the OSDA is not only an expensive method but also a production method having a great environmental load. Thus, there is a need to realize a production method using no OSDAs and a VET-type zeolite essentially containing no organic matters obtained by the method.

Patent Document 1: U.S. Pat. No. 5,656,149, Specification
Patent Document 1: U.S. Pat. No. 5,591,421, Specification
Non-Patent Document 1: Journal of American Chemical Society, 1996, 118, 7299~7310
Non-Patent Document 2: Microporous Materials, 1997, 11, 127~136
Non-Patent Document 3: Microporous Materials, 1997, 11, 137~148
Non-Patent Document 4: Chemistry: a European Journal, 2002, 8, 22, 5153~5160

DISCLOSURE OF THE INVENTION

Problems to be Solved by the Invention

An object of the present invention is to provide a production method of a VET-type zeolite essentially containing no organic matters, that is, a method which can solve drawbacks of the prior art described above, reduce an environmental load as much as possible and produce a VET-type zeolite at low cost without using OSDA.

Means for Solving the Problems

The present invention provides a production method for a VET-type zeolite, which includes
(1) mixing a zinc source, an element $M^1$ source, an alkali source, and water so as to be a reaction mixture having a composition represented by a molar ratio given below;

$M^1O_2/ZnO=5-300$

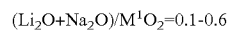

$(Li_2O+Na_2O)/M^1O_2=0.1-0.6$

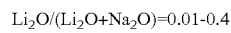

$Li_2O/(Li_2O+Na_2O)=0.01-0.4$

$H_2O/M^1O_2=5-50$ where $M^1$ denotes silicon or a mixture of silicon and germanium;
(2) using a VET-type zeolite having an $M^1O_2/ZnO$ ratio of 5-30 as a seed crystal, and adding the VET-type zeolite to the reaction mixture at a proportion of 0.1-30% by weight with respect to $M^1O_2$ in the reaction mixture; and
(3) airtightly heating the reaction mixture to which the seed crystal has been added at 80-200° C.

Effects of the Invention

According to the present invention, a VET-type zeolite is produced from a reaction mixture using no OSDAs and therefore, the resulting VET-type zeolite essentially contains no organic matters. Thus, since the VET-type zeolite not only requires no firing treatments before use, but also generates no organic matters even after dehydration treatment, the exhaust gas treatment is not necessary, an environmental load is small and it is possible to produce the VET-type zeolite at low cost.

PREFERRED MODE FOR CARRYING OUT THE INVENTION

Figure 1:
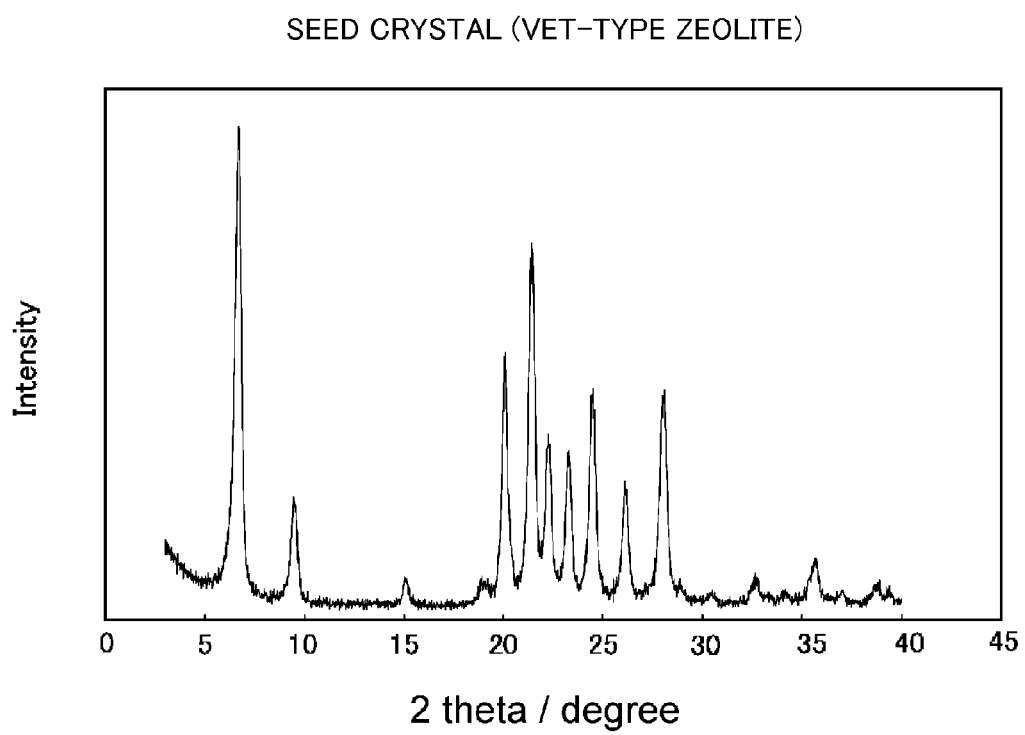
FIG. 1 is an X-ray diffraction diagram of a seed crystal of a VET-type zeolite used in Example 1.

The present invention will be explained based on its preferred embodiment below. Before a production method of the present invention is described, a preferable VET-type zeolite to be synthesized according to the present invention is described. A VET-type zeolite synthesized according to the present invention has a zincosilicate framework. As it is synthesized, the VET-type zeolite preferably has a composition represented by a molar ratio given below.

$M^1O_2/ZnO$=5-50, in particular 8-30

$(Li_2O+Na_2O)/ZnO$=0.7-1.5, in particular 0.9-1.2

$Li_2O/(Li_2O+Na_2O)$=0.01-0.9, in particular 0.05-0.7

In the formulae, $M^1$ denotes silicon or a mixture of silicon and germanium.

The VET-type zeolite synthesized according to the present invention may further contain aluminum, iron, gallium, or a mixture of two or more of these (hereinafter, also called an element $M^2$). When containing $M^2$, the VET-type zeolite as it is synthesized preferably has a composition represented by a molar ratio given below.

$M^1O_2/ZnO$=5-50, in particular 8-30

$M^1O_2/M^2{}_2O_3$=50-1000, in particular 70-1000

$(Li_2O+Na_2O)/ZnO$=0.7-1.5, in particular 0.9-1.2

$Li_2O/(Li_2O+Na_2O)$=0.01-0.9, in particular 0.05-0.7

When containing $M^2$ as described above, the zeolite can have a metallosilicate framework where some zinc atoms within the zincosilicate framework are substituted with $M^2$ atoms.

A VET-type zeolite synthesized according to the present invention essentially contains no organic matters in a state in which it is not heat-treated. The organic matter herein primarily encompasses quaternary ammonium compounds used as an OSDA in the synthesis of zeolites. Ions present outside the framework by charge compensation for the negative charge of the four-coordinated metal in the VET-type zeolite framework are alkali metal ions such as sodium ions and lithium ions, and others present in the pore are only water or a small amount of adsorption gases. That is, the VET-type zeolite synthesized according to the present invention is obtained by a production method using no OSDAs described below and therefore, it essentially contains no organic matters including the OSDAs. The $M^1O_2$/ZnO ratio in the VET-type zeolite synthesized according to the present invention preferably ranges from 5 to 50 and more preferably ranges from 8 to 30.

One feature of the production method of the present invention is to prepare a reaction mixture without adding any OSDAs which consist of organic compounds. That is, an aqueous zincosilicate gel containing lithium ions and sodium ions is used as the reaction mixture. It is an essential condition for lithium ions and sodium ions to be present in the reaction mixture of the aqueous zincosilicate gel. The presence of alkali metal ions other than lithium ions and sodium ions, such as potassium ions is not essential in the production method of the present invention. However, in the production method of the present invention, using alkali metal ions other than lithium ions and sodium ions is not excluded.

Another feature of the production method of the present invention is to use a seed crystal. As the seed crystal, one obtained by firing the VET-type zeolite produced by the conventional method, that is, a method using an OSDA to remove organic matters can be used. A synthetic method of the VET-type zeolite according to the conventional method is described in Patent Documents 1 and 2, and Non-Patent Documents 1-4 described above, for example, and is well known to a person skilled in the art. In the synthetic method of the VET-type zeolite according to the conventional method, the type of the OSDA used is not limited. In general, by using a tetraethylammonium compound as an OSDA, the VET-type zeolite can be successfully produced.

In the synthesis of the seed crystal, an OSDA is added to a zinc source and a silica source. The "silica source" herein is a substance for use as a raw material of a substance represented by $M^1O_2$ ($M^1$ denotes silicon or a mixture of silicon and germanium). In the synthesis of the seed crystal, an element $M^2$ source may further be added. The element $M^2$ source is a substance for use as a raw material of a substance represented by $M^2{}_2O_3$ ($M^2$ denotes aluminum, iron, gallium, or a mixture of two or more of these). If the VET-type zeolite is synthesized in this way, then before it is used as a seed crystal, it is fired at a temperature of 500° C. or higher in the air to remove the OSDA incorporated in the crystal, for example. It is also possible to carry out the present invention using a seed crystal from which an OSDA has not been removed, but in this case, the resulting VET-type zeolite contains organic matters in a small amount, which is contrary to an object of the present invention. In the production method of the present invention, the VET-type zeolite obtained according to the present invention can be used as a seed crystal. Since the VET-type zeolite obtained in the present invention essentially contains no organic compounds, it has an advantage of not needing to be fired in advance when it is used as a seed crystal.

In either case of using the VET-type zeolite obtained according to the conventional method or using the VET-type zeolite obtained according to the present invention, an $M^1O_2$/ZnO ratio of the seed crystal is in the range of 5-30 and preferably in the range of 8-20. By setting the $M^1O_2$/ZnO ratio of the seed crystal equal to or greater than 5, the crystallization rate of the VET-type zeolite can be sufficiently fast. On the other hand, by setting the $M^1O_2$/ZnO ratio equal to or less than 30, the VET-type zeolite can be easily synthesized.

The addition amount of the seed crystal is in the range of 0.1-30% by weight in relation to $M^1O_2$ in the reaction mixture and preferably in the range of 1-20% by weight. Provided that the addition amount is within this range, the addition amount of the seed crystal is preferably less and is determined taking into account the reaction rate and the inhibitory effect of impurities.

The reaction mixture to which the seed crystal is added is obtained by mixing the zinc source, the element $M^1$ source, the alkali source, and water so as to be a reaction mixture having a composition represented by a molar ratio given below. If the composition of the reaction mixture is out of this range, a desired VET-type zeolite is less likely to be obtained. $M^1$ denotes silicon or a mixture of silicon and germanium. When $M^1$ is a mixture of silicon and germanium, the molar ratio of silicon and germanium preferably satisfies Si:Ge=1:0.01-1:1.

$M^1O_2/ZnO=5\text{-}300$ $(Li_2O+Na_2O)/M^1O_2=0.1\text{-}0.6$ $Li_2O/(Li_2O+Na_2O)=0.01\text{-}0.4$ $H_2O/M^1O_2=5\text{-}50$ The more preferred range of the composition of the reaction mixture is as follows. This range is preferable because a VET-type zeolite excellent in a degree of crystallinity is obtained.

$M^1O_2/ZnO=8\text{-}200$ $(Li_2O+Na_2O)/M^1O_2=0.15\text{-}0.4$ $Li_2O/(Li_2O+Na_2O)=0.03\text{-}0.3$ $H_2O/M^1O_2=10\text{-}30$ In the present invention, the zinc source, the element $M^1$ source, the alkali source, water, and the element $M^2$ source may be mixed to give a reaction product so that the reaction mixture has a composition represented by a molar ratio given below. $M^2$ denotes aluminum, iron, gallium, or a mixture of two or more of these.

$M^1O_2/ZnO=5\text{-}300$ $M^1O_2/M^2{}_2O_3=50\text{-}1000$ $(Li_2O+Na_2O)/M^1O_2=0.1\text{-}0.6$ $Li_2O/(Li_2O+Na_2O)=0.01\text{-}0.4$ $H_2O/M^1O_2=5\text{-}50$ Use of $M^2$ in the present invention is advantageous because the use enables control of solid acid properties. As $M^2$, aluminum or a mixture of aluminum and one or more of iron and gallium is preferable, and aluminum is particularly preferable.

When using $M^2$ in the present invention, the following range of the composition of the reaction mixture is further preferable. This range is preferable because a VET-type zeolite excellent in a degree of crystallinity is obtained.

$M^1O_2/ZnO=8\text{-}200$ $M^1O_2/M^2{}_2O_3=80\text{-}1000$ $(Li_2O+Na_2O)/M^1O_2=0.15 \text{ to } 0.4$ $Li_2O/(Li_2O+Na_2O)=0.03 \text{ to } 0.3$ $H_2O/M^1O_2=10\text{-}30$ The element $M^1$ source used to obtain the reaction mixture having said molar ratio includes a silicon source and a germanium source to be described in the following. The silicon source includes silica and a silicon-containing compound capable of forming silicate ions in water. Specifically, wet process silica, dry process silica, colloidal silica, sodium silicate, zincosilicate gels and the like can be referred to. Among these silicon sources, the use of silica (silicon dioxide) is preferred in that it is possible to obtain a zeolite of interest without unwanted by-products. The germanium source includes oxides of germanium such as germanium oxide and tetraalkyl o-germanate. These element $M^1$ sources can be used alone or in combination of two or more regardless of whether $M^1$ is silicon or a mixture of silicon and germanium.

The zinc source includes zinc acetate, zinc nitrate, and zinc oxide. These zinc sources can be used alone or in combination of two or more.

As the alkali source, for example, sodium hydroxide and lithium hydroxide can be used. In the case of using lithium silicate as the element $M^1$ source or using sodium aluminate as the element $M^2$ source, sodium or lithium, an alkali metal component contained therein, is considered NaOH or LiOH at the same time and it is also the alkali component. Thus, said $Na_2O$ and $Li_2O$ are calculated as the sum of all alkali components in the reaction mixture.

The element $M^2$ source includes an aluminum source, an iron source, and a gallium source to be described in the following. As the aluminum source, for example, a water-soluble aluminum-containing compound and powdered aluminum can be used. As the water-soluble aluminum-containing compound, sodium aluminate, aluminum nitrate, aluminum sulfate and the like can be referred to. Furthermore, aluminum hydroxide is also one of the preferred aluminum sources. An aluminosilicate gel and aluminosilicate zeolite can also be used, for example. Among these aluminum sources, the use of powdered aluminum, sodium aluminate, aluminum hydroxide or aluminosilicate zeolite is preferred in that it is possible to obtain a zeolite of interest without unwanted by-products (for example, sulfates and nitrates and the like). The iron source includes iron sulfate and iron nitrate. The gallium source includes gallium sulfate and gallium nitrate. These element $M^2$ sources can be used alone or in combination of two or more regardless of whether $M^2$ is aluminum, iron, gallium, or a mixture of these.

A method by which a uniform reaction mixture is easily obtained may be used as the order of addition of each raw material when preparing the reaction mixture. For example, at room temperature, a zinc source and an alkali source may be added to and dissolved in water, followed by adding an element $M^1$ source and agitating and mixing to give a uniform reaction mixture. When using an element $M^2$ in the present invention, the element $M^2$ source is simply required to be added together with the zinc source and the alkali source to water. A seed crystal is added before adding the $M^1$ source or after mixing with the $M^1$ source. Thereafter, the mixture is agitated and mixed to ensure uniform dispersion of the seed crystal. There is no restriction on the temperature when preparing the reaction mixture.

In particular, it is preferred that since the VET-type zeolite of interest can be successfully obtained, after the reaction mixture not containing the seed crystal is put into an airtight vessel and preheated under autogenous pressure, the seed crystal is added. It is especially preferred that since the VET-type zeolite of interest can be more successfully obtained, after the reaction mixture is preheated and then rapidly cooled to room temperature, the seed crystal is added. In any of these cases, preparation of the reaction mixture is preferably performed in the procedure of adding an element $M^1$ source to a liquid containing a zinc source and an alkali source when no element $M^2$ is used, and when an element $M^2$ is used, preparation of the reaction mixture is preferably performed in the procedure of adding an element $M^1$ source to a liquid containing a zinc source, an alkali source, and an element $M^2$ source. The temperature and time of preheating of the reaction mixture is not particularly limited. Specifically, the temperature of preheating is preferably 80-200° C. and more preferably 100-200° C. The time of preheating is preferably 0.5-24 hours and particularly 1-20 hours provided that the temperature of preheating is within this range. The temperature of preheating and the crystallization temperature after adding the seed crystal may be the same or different temperatures, and are not particularly limited. It is sufficient to set the conditions under which crystallization efficiently proceeds in combination with the heating time.

The seed crystal is added to the reaction mixture which has or has not been subjected to preheating and then the reaction mixture containing the seed crystal is put into an airtight vessel, heated and reacted to crystallize the VET-type zeolite under autogenous pressure. An OSDA is not contained in the reaction mixture. A seed crystal which was obtained by the method described in any one of Patent Documents 1 and 2 and Non-Patent Documents 1-4 described above can be subjected to an operation such as firing and used in a state in which no organic matters such OSDAs are contained.

If the VET-type zeolite is crystallized using the reaction mixture containing the seed crystal, it is preferred that heating is performed after aging since crystallization more easily proceeds. Aging refers to an operation of keeping the temperature lower than the reaction temperature for a certain period of time. In aging, in general, still standing is performed without agitating. It is known that aging has effects such as preventing by-production of impurities, allowing heating under agitation without by-production of impurities, and increasing the reaction rate, but their action mechanisms are not necessarily clear. The temperature and time of aging are set so that said effects can be maximally exhibited. In the present production method, aging is preferably performed at 20-80° C., more preferably at 20-60° C., preferably in the range of 2-24 hours.

While heating the reaction mixture containing the seed crystal to crystallize it, in order to achieve homogenization of the reaction mixture temperature, the reaction mixture may be agitated. The agitation can be performed by mixing with agitation blades and mixing by rotation of the vessel. The agitation intensity and speed of rotation may be adjusted depending on the temperature uniformity and the degree of impurities by-production. It may be intermittent agitation, not constant agitation.

In either case of performing crystallization under a still standing state and under an agitating state, heating is airtightly performed. Heating temperature ranges from 80-200° C., preferably from 120-200° C. and more preferably from 140-200° C. The heating is performed under autogenous pressure. Generation efficiency of the VET-type zeolite becomes worse at temperatures below 80° C. because the crystallization rate becomes extremely slow. On the other hand, at temperatures higher than 200° C., since an autoclave with high pressure resistance is required, not only economic efficiency is lacked, but also generation rate of impurities increases. Heating time is not critical in the present production method, and heating may be performed until the VET-zeolite with sufficiently high crystallinity is produced. In general, heating for about 2-150 hours provides the VET-type zeolite with satisfactory crystallinity.

The crystal of the VET-type zeolite is obtained by said heating. After completion of heating, the produced crystalline powders are separated from the mother liquor by filtration, followed by washing with water or warm water and drying. Firing is not needed and it can be used as an adsorbent and the like immediately after dehydration is performed because it essentially contains no organic materials in its dried state. In addition, when it is used as a solid acid catalyst, for example, it can be used as the $H^+$-type by firing after replacing $Na^+$ ions and $Li^+$ ions in the crystal with $NH_4^+$ ions.

The VET-type zeolite obtained in the present production method can be suitably used, for example, as an adsorption-separating agent in various industrial fields or as different types of catalysts in a hydrocarbon conversion reaction in the petrochemical industry. Examples of the hydrocarbon conversion reaction include catalytic cracking, hydrocracking, dewaxing, alkylation, transalkylation, and production and isomerization of olefins and aromatic compounds.

EXAMPLES

Hereinafter, the present invention will be described in more detail by examples. However, the scope of the present invention is not limited to such examples. Unless mentioned otherwise, "%" refers to "% by weight". Analyzers used in the examples and comparative examples below are as follows.

Powder X-ray diffraction device: powder X-ray diffraction device MO3XHF[22] (radiation of CuKα-ray, voltage of 40 kV, current of 30 mA, scan step of 0.02°, and scan speed of 2°/min) made by Mac Science Co., Ltd.

Composition analysis device: ICP-AES LIBERTY Series II made by Varian Co., Ltd.

Example 1

(1) Synthesis of Seed Crystal

A seed crystal was synthesized according to the method described in Non-patent Document 2. Tetraethylammonium hydroxide as an OSDA, zinc acetate as a zinc source, and colloidal silica (Ludox, HS-40) as a silica source were heated, while being left still standing, at 150° C. for 144 hours to synthesize VPI-8 (VET-type zeolite). The resultant was fired in an electric furnace in an air stream at 550° C. for 10 hours to synthesize a VPI-8 (VET-type zeolite) crystal containing no organic matters. A diagram of X-ray diffraction performed after firing is shown in FIG. 1. The composition of the crystal was analyzed, giving an $SiO_2/ZnO$ ratio of 13.6. This VET-type zeolite crystal containing no organic matters was used as a seed crystal in the following examples.

(2) Synthesis of VET-Type Zeolite

Figure 2:
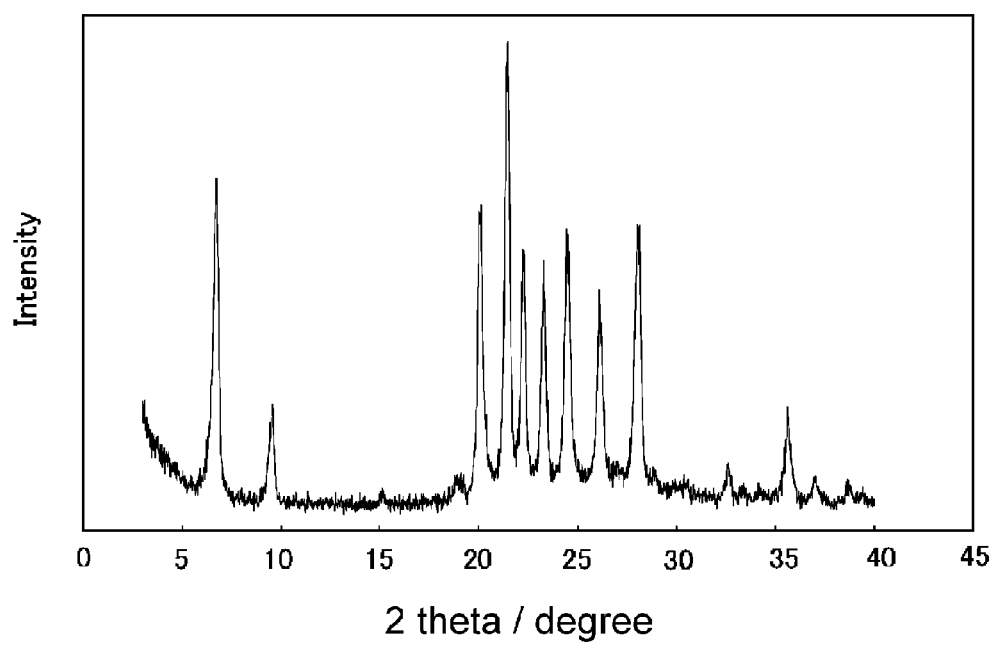
FIG. 2 is an X-ray diffraction diagram of a VET-type zeolite obtained by Example 1.

In 3.495 g of deionized water, 0.066 g of zinc acetate, 0.836 g of 36% sodium hydroxide, and 0.025 g of lithium hydroxide monohydrate were dissolved, giving an aqueous solution. In the resulting aqueous solution, 0.090 g of the seed crystal was dispersed. Thereto, 2.252 g of colloidal silica (Ludox, HS-40) was gradually added while mixing with agitating, giving a gel having the composition shown in Table 1. Having this composition, the resulting gel if used alone for zeolite synthesis could give a layered silicate. The resulting mixture of the gel and the seed crystal was placed in a 23-cc airtight stainless steel vessel and then heated while being left still standing at 150° C. under autogenous pressure for 72 hours, without performing aging or agitating. The airtight vessel was then cooled, and the resulting product was filtrated and washed with warm water to give a white powder. A diagram of X-ray diffraction of the product is shown in FIG. 2. It was confirmed that the product was a VET-type zeolite containing no impurity. The composition of the VET-type zeolite was analyzed, giving an $SiO_2/ZnO$ ratio of 13.7.

Examples 2 to 6

A product was obtained in the same manner as in Example 1 except that conditions shown in Table 1 were employed. X-ray diffraction measurement confirmed that the resulting product was a VET-type zeolite containing no impurity. The composition of the VET-type zeolite obtained in Example 2 and Example 3 was analyzed, giving an $SiO_2/ZnO$ ratio of 12.3 for Example 2 and 13.5 for Example 3.

Example 7

A product was obtained in the same manner as in Example 1 except that 0.033 g of zinc acetate, 0.764 g of 36% sodium hydroxide, 0.050 g of lithium hydroxide monohydrate, and 0.012 g of aluminum hydroxide as an $M^2$ source were dissolved in 3.543 g of deionized water to give an aqueous solution. X-ray diffraction measurement confirmed that the resulting product was a VET-type zeolite containing no impurity.

Example 8

A product was obtained in the same manner as in Example 7 except that conditions shown in Table 1 were employed. X-ray diffraction measurement confirmed that the resulting product was a VET-type zeolite containing no impurity.

Examples 9 and 10

Figure 3:
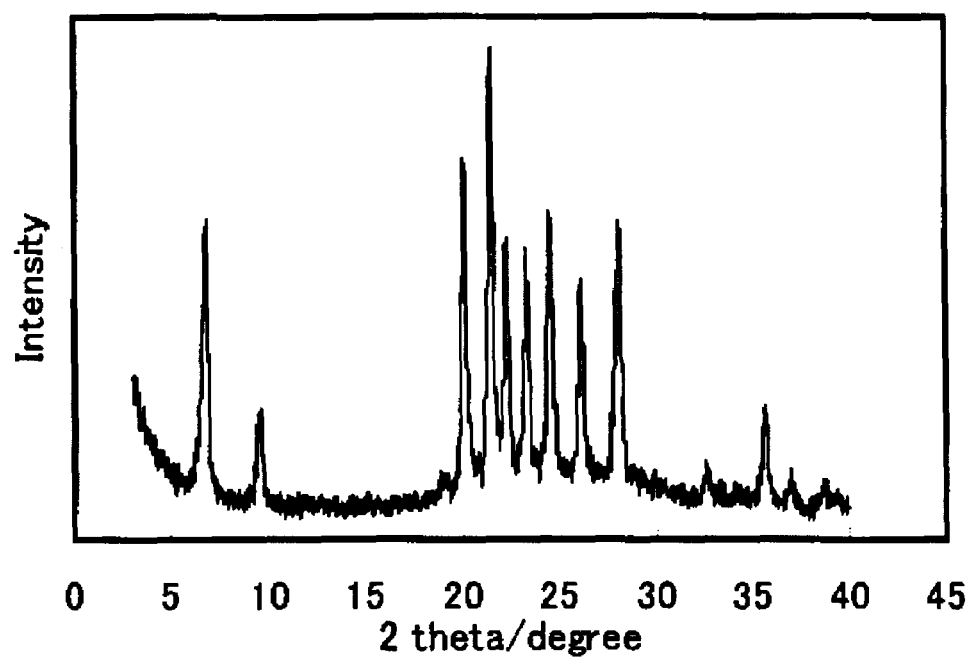
FIG. 3 is an X-ray diffraction diagram of a VET-type zeolite obtained by Example 10.

A product was obtained in the same manner as in Example 7 except that a Y-type zeolite (manufactured by Tosoh Corporation, HSZ-390HUA) was used as an $M^2$ source and conditions shown in Table 1 were employed. X-ray diffraction measurement confirmed that the resulting product was a VET-type zeolite containing no impurity. A diagram of X-ray diffraction of the product obtained in Example 10 is shown in FIG. 3. The composition of the obtained VET-type zeolite was analyzed, giving an $SiO_2/ZnO$ ratio of 16.6 and an $SiO_2/Al_2O_3$ ratio of 351 for Example 9 and an $SiO_2/ZnO$ ratio of 14.2 and an $SiO_2/Al_2O_3$ ratio of 295 for Example 10.

Comparative Example 1

In 3.495 g of deionized water, 0.066 g of zinc acetate, 0.836 g of 36% sodium hydroxide, and 0.025 g of lithium hydroxide monohydrate were dissolved, giving an aqueous solution. To the resulting aqueous solution, 2.252 g of colloidal silica (Ludox, HS-40) was gradually added while mixing with agitating, giving a gel having the composition shown in Table 2. The resulting gel was placed in a 23-cc airtight stainless steel vessel and then heated while being left still standing at 150° C. under autogenous pressure for 168 hours, without performing aging or agitating. The airtight vessel was then cooled, and the resulting product was filtrated and washed with warm water to give a white powder. X-ray diffraction measurement of the product confirmed that the product was a layered silicate.

Comparative Example 2

A product was obtained in the same manner as in Comparative Example 1 except that conditions shown in Table 2 were employed. X-ray diffraction measurement confirmed that the resulting product was a GIS-type zeolite.

TABLE 1

| Example | Composition of reaction mixture | | | | | | | Seed crystal | Heating condition | | Agitating | Product |
| | $SiO_2/ZnO$ | $SiO_2/Al_2O_3$ | $Na_2O/SiO_2$ | $Li_2O/SiO_2$ | $(Li_2O + Na_2O)/SiO_2$ | $Li_2O/(Li_2O + Na_2O)$ | $H_2O/SiO_2$ | $SiO_2/ZnO$ | Amount of addition (wt %) | Temperature (° C.) | Time (h) | Speed of rotation (rpm) | |
| --- | --- | --- | --- | --- | --- | --- | --- | --- | --- | --- | --- | --- | --- |
| 1 | 50 | ∞ | 0.23 | 0.02 | 0.25 | 0.08 | 20 | 13.6 | 10 | 150 | 72 | 0 | VET-type zeolite |
| 2 | 50 | ∞ | 0.26 | 0.02 | 0.28 | 0.07 | 20 | 13.6 | 10 | 150 | 72 | 0 | VET-type zeolite |
| 3 | 40 | ∞ | 0.23 | 0.03 | 0.26 | 0.10 | 20 | 13.6 | 10 | 150 | 80 | 0 | VET-type zeolite |
| 4 | 30 | ∞ | 0.22 | 0.03 | 0.25 | 0.13 | 20 | 13.6 | 10 | 150 | 72 | 0 | VET-type zeolite |
| 5 | 15 | ∞ | 0.25 | 0.07 | 0.32 | 0.21 | 20 | 13.6 | 10 | 150 | 72 | 0 | VET-type zeolite |
| 6 | 50 | ∞ | 0.21 | 0.04 | 0.25 | 0.16 | 20 | 13.6 | 10 | 150 | 72 | 0 | VET-type zeolite |
| 7 | 100 | 50 | 0.21 | 0.04 | 0.25 | 0.16 | 20 | 13.6 | 10 | 150 | 84 | 0 | VET-type zeolite |
| 8 | 56 | 250 | 0.23 | 0.02 | 0.25 | 0.08 | 20 | 13.6 | 10 | 150 | 96 | 0 | VET-type zeolite |
| 9 | 50 | 810 | 0.21 | 0.04 | 0.25 | 0.16 | 20 | 13.6 | 10 | 150 | 72 | 0 | VET-type zeolite |
| 10 | 50 | 810 | 0.24 | 0.04 | 0.28 | 0.14 | 20 | 13.6 | 10 | 150 | 72 | 0 | VET-type zeolite |

TABLE 2

| Comparative Example | Composition of reaction mixture | | | | | | | Seed crystal | Heating condition | | Agitating | Product |
| | $SiO_2/ZnO$ | $SiO_2/Al_2O_3$ | $Na_2O/SiO_2$ | $Li_2O/SiO_2$ | $(Li_2O + Na_2O)/SiO_2$ | $Li_2O/(Li_2O + Na_2O)$ | $H_2O/SiO_2$ | Amount of addition (wt %) | Temperature (° C.) | Time (h) | Speed of rotation (rpm) | |
| --- | --- | --- | --- | --- | --- | --- | --- | --- | --- | --- | --- | --- |
| 1 | 50 | ∞ | 0.23 | 0.02 | 0.25 | 0.08 | 20 | 0 | 150 | 168 | 0 | Layered silicate |
| 2 | 27.85 | ∞ | 0.25 | 0.19 | 0.44 | 0.43 | 20 | 0 | 150 | 72 | 0 | GIS-type zeolite |

As is apparent from the comparison between Tables 1 and 2, it is understood that by using a particular VET-type zeolite as a seed crystal and adding it to a reaction mixture having a particular composition to perform crystallization as in Examples 1 to 10, a VET-type zeolite can be obtained. When no seed crystal is used as in Comparative Examples 1 and 2, a layered silicate or a zeolite other than a VET-type zeolite is produced.

The invention claimed is:

1. A production method for a VET-type zeolite, which comprises
   (1) mixing a zinc source, an element $M^1$ source, an alkali source, and water so as to be a reaction mixture having a composition represented by a molar ratio given below;

$M^1O_2/ZnO = 5\text{-}300$ $(Li_2O+Na_2O)/M^1O_2 = 0.1\text{-}0.6$ $Li_2O/(Li_2O+Na_2O) = 0.01\text{-}0.4$ $H_2O/M^1O_2 = 5\text{-}50$ where $M^1$ denotes silicon or a mixture of silicon and germanium;
   (2) using a VET-type zeolite having an $M^1O_2/ZnO$ ratio of 5-30 as a seed crystal, and adding the VET-type zeolite to the reaction mixture at a proportion of 0.1-30% by weight with respect to $M^1O_2$ in the reaction mixture; and
   (3) airtightly heating the reaction mixture to which the seed crystal has been added at 80-200° C.

2. The production method according to claim 1, wherein the step (1) comprises mixing the zinc source, the element $M^1$ source, the alkali source, water, and an element $M^2$ source so that the reaction mixture has a composition represented by a molar ratio given below:

$M^1O_2/ZnO = 5\text{-}300$ $M^1O_2/M^2O_3 = 50\text{-}1000$ $(Li_2O+Na_2O)/M^1O_2 = 0.1\text{-}0.6$ $Li_2O/(Li_2O+Na_2O) = 0.01\text{-}0.4$ $H_2O/M^1O_2 = 5\text{-}50$ where $M^2$ denotes aluminum, iron, gallium, or a mixture of two or more of these.

3. The production method according to claim 2, wherein after the reaction mixture not containing the seed crystal is airtightly heated at a temperature of 80-200° C., the seed crystal is added to the reaction mixture, and the reaction mixture is further airtightly heated at a temperature of 80-200° C.

4. The production method according to claim 2, wherein the reaction mixture is agitated in the airtightly heating process.

5. The production method according to claim 1, wherein after the reaction mixture not containing the seed crystal is airtightly heated at a temperature of 80-200° C., the seed crystal is added to the reaction mixture, and the reaction mixture is further airtightly heated at a temperature of 80-200° C.

6. The production method according to claim 5, wherein the reaction mixture is agitated in the airtightly heating process.

7. The production method according to claim 1, wherein the reaction mixture is agitated in the airtightly heating process.

* * * * *